United States Patent
Rudie et al.

(10) Patent No.: US 12,022,847 B2
(45) Date of Patent: Jul. 2, 2024

(54) METHODS OF EGG YOLK FRACTIONATION

(71) Applicant: Michael Foods, Inc., Minnetonka, MN (US)

(72) Inventors: Noel G. Rudie, Chaska, MN (US); Alicia Stube, Chaska, MN (US); Daniel L. Vance, Acworth, GA (US)

(73) Assignee: MICHAEL FOODS, INC., Minnetonka, MN (US)

( * ) Notice: Subject to any disclaimer, the term of this patent is extended or adjusted under 35 U.S.C. 154(b) by 514 days.

(21) Appl. No.: 16/626,562

(22) PCT Filed: Jun. 24, 2018

(86) PCT No.: PCT/US2018/039190
§ 371 (c)(1),
(2) Date: Dec. 25, 2019

(87) PCT Pub. No.: WO2019/005645
PCT Pub. Date: Jan. 3, 2019

(65) Prior Publication Data
US 2020/0113205 A1 Apr. 16, 2020

Related U.S. Application Data

(60) Provisional application No. 62/525,132, filed on Jun. 26, 2017.

(51) Int. Cl.
*A23J 1/08* (2006.01)
(52) U.S. Cl.
CPC .......................... *A23J 1/08* (2013.01)
(58) Field of Classification Search
CPC .......................................................... A23J 1/08
See application file for complete search history.

(56) References Cited

U.S. PATENT DOCUMENTS

| | | | |
|---|---|---|---|
| 2,377,961 A | 6/1945 | Pollak |
| 2,451,116 A | 10/1948 | Pollak |
| 3,737,326 A | 6/1973 | Basso et al. |
| 3,950,557 A | 4/1976 | Kheng |
| 3,970,520 A | 7/1976 | Feldman et al. |
| 4,034,124 A | 7/1977 | van Dam |
| 4,330,446 A | 5/1982 | Miyosawa |
| 4,364,966 A | 12/1982 | Chang |
| 4,486,413 A | 12/1984 | Wiesenberger et al. |
| 4,552,845 A | 11/1985 | Reid |
| 4,612,197 A | 9/1986 | Postner |
| 4,721,674 A | 1/1988 | Lepienne et al. |
| 4,814,111 A | 3/1989 | Kearns et al. |
| 4,847,015 A | 7/1989 | Shigematsu et al. |
| 4,986,918 A | 1/1991 | Breslau et al. |
| 5,028,447 A | 7/1991 | Schenk |
| 5,302,405 A | 4/1994 | Hsieh et al. |
| 5,342,633 A | 8/1994 | Cully et al. |
| 5,367,054 A | 11/1994 | Lee |
| 5,468,844 A | 11/1995 | Smith |
| 5,487,912 A | 1/1996 | Mei et al. |
| 5,690,986 A | 11/1997 | Okutomi et al. |
| 5,716,526 A | 2/1998 | Kelemen et al. |
| 5,932,250 A | 8/1999 | Stolle et al. |
| 5,945,149 A | 8/1999 | Andreae et al. |
| 6,174,443 B1 | 1/2001 | Ruckenstein et al. |
| 6,217,926 B1 | 4/2001 | Merkle et al. |
| 6,287,623 B1 | 9/2001 | Nakayama et al. |
| 6,680,376 B2 | 1/2004 | Chiou |
| 6,773,731 B2 | 8/2004 | Campbell et al. |
| 6,863,909 B2 | 3/2005 | Baensch et al. |
| 7,094,439 B2 | 8/2006 | Akashe et al. |
| 7,101,585 B2 | 9/2006 | Shen et al. |
| 7,166,223 B2 | 1/2007 | Bomberger et al. |
| 7,297,261 B2 | 11/2007 | Bomberger et al. |
| 7,297,262 B2 | 11/2007 | Bomberger et al. |
| 7,338,553 B2 | 3/2008 | Foster |
| 7,368,215 B2 | 5/2008 | Munnelly et al. |
| 7,402,246 B2 | 7/2008 | Bomberger et al. |
| 7,566,570 B2 | 7/2009 | Abril |
| 7,582,326 B2 | 9/2009 | Brown et al. |
| 7,851,008 B2 | 12/2010 | Campbell et al. |
| 8,056,844 B2 | 11/2011 | Vlad |
| 8,080,272 B2 | 12/2011 | Strohbehn et al. |
| 8,133,521 B2 | 3/2012 | Strohbehn et al. |
| 8,173,174 B2 | 5/2012 | Strohbehn et al. |

(Continued)

FOREIGN PATENT DOCUMENTS

| | | | |
|---|---|---|---|
| CA | 2803101 C | | 11/2019 |
| CN | 101343320 | * | 1/2009 |

(Continued)

OTHER PUBLICATIONS

Translation for CN101690811 published Apr. 2010.*
Translation for CN101690812 published Apr. 2010.*
Translation for CN101343320 published Jan. 2009.*
Search Report from EP appl. No. 18824941, dated Feb. 19, 2021.
S. Navidghasemizad et al., "Physicochemical properties of leftover egg yolk after livetins removal," LWT—Food Sci. and Tech., vol. 55, No. 1, pp. 170-175 (Jan. 2014; Elsevier Ltd.).
English language abstract of I.J. Kim et al., "Establishment of aqueous extraction condition for the separation of cholesterol from egg yolk using response surface method," Korean J. of Animal Sci. (Jun. 1998).

(Continued)

*Primary Examiner* — Anthony J Weier

(74) *Attorney, Agent, or Firm* — Norton Rose Fulbright US LLP

(57) ABSTRACT

Liquid egg yolk can be fractionated into water soluble and precipitated lipophilic fractions without the need to freeze or add carbohydrate(s). A composition that includes egg yolk and an excess of water has its pH downwardly adjusted before being gravitationally separated into low and high density fractions, with the former including no more than 5% of the granules from the egg yolk.

19 Claims, No Drawings

(56) References Cited

U.S. PATENT DOCUMENTS

| | | | |
|---|---|---|---|
| 8,173,783 | B2 | 5/2012 | Chiou |
| 8,197,852 | B2 | 6/2012 | Strohbehn et al. |
| 8,197,853 | B2 | 6/2012 | Strohbehn et al. |
| 8,211,477 | B2 | 7/2012 | Strohbehn et al. |
| 8,273,394 | B2 | 9/2012 | Watanabe et al. |
| 8,642,038 | B2 | 2/2014 | Mason |
| 8,653,246 | B2 | 2/2014 | Shirataki et al. |
| 8,784,926 | B2 | 7/2014 | Strohbehn et al. |
| 8,877,253 | B2 | 11/2014 | Gammelsaeter et al. |
| 8,916,156 | B2 | 12/2014 | Mason |
| 9,497,983 | B2 | 11/2016 | Minor et al. |
| 2003/0009014 | A1 | 1/2003 | Chiou |
| 2004/0029164 | A1 | 2/2004 | Ransohoff |
| 2005/0079259 | A1 | 4/2005 | Gao et al. |
| 2007/0017447 | A1 | 1/2007 | Vlad |
| 2008/0071067 | A1 | 3/2008 | Chen et al. |
| 2009/0304863 | A1 | 12/2009 | Okuyama et al. |
| 2012/0046449 | A1 | 2/2012 | Green et al. |
| 2012/0264688 | A1 | 10/2012 | Hinderer et al. |
| 2014/0141126 | A1 | 5/2014 | Bratton et al. |
| 2014/0220225 | A1 | 8/2014 | Alden |
| 2015/0094453 | A1 | 4/2015 | Mason |
| 2017/0223989 | A1 | 8/2017 | Jimenez et al. |
| 2020/0138066 | A1 | 5/2020 | Anchel |

FOREIGN PATENT DOCUMENTS

| | | | |
|---|---|---|---|
| CN | 101438761 | A | 5/2009 |
| CN | 101690811 | * | 4/2010 |
| CN | 101690812 | * | 4/2010 |
| CN | 107518236 | A | 12/2017 |
| EP | 0102416 | A1 | 3/1984 |
| EP | 1627570 | A1 | 2/2006 |
| EP | 1371665 | B1 | 8/2009 |
| EP | 1993693 | B1 | 10/2013 |
| EP | 1897452 | B1 | 9/2016 |
| EP | 2926674 | B1 | 11/2016 |
| ES | 2310500 | B2 | 3/2010 |
| KR | 2015077954 | * | 7/2015 |
| RU | 1825302 | | 6/1993 |
| RU | 2304587 | C2 | 12/2003 |
| WO | 1999007458 | A1 | 2/1999 |
| WO | 2005099487 | A1 | 10/2005 |
| WO | 2008086621 | A1 | 7/2008 |
| WO | WO2008/080737 | | 7/2008 |
| WO | 2013002786 | A1 | 1/2013 |
| WO | 2016077457 | A1 | 5/2016 |
| WO | 2017136119 | A1 | 8/2017 |
| WO | 2020206399 | A1 | 10/2020 |

OTHER PUBLICATIONS

A. Laca et al., "Egg yolk granules: Separation, characteristics and applications in food industry," LWT—Food Sci. and Tech., vol. 59, No. 1, pp. 1-5 (May 2014; Elsevier Ltd.).

International Search Report & Opinion issued in corresponding International Application No. PCT/US2018/039190, Oct. 25, 2018.

* cited by examiner

METHODS OF EGG YOLK FRACTIONATION

CROSS-REFERENCE TO RELATED APPLICATION

This is a national stage entry of international application PCT/US2018/039190 which claims the benefit of U.S. provisional patent application Ser. No. 62/525,132, filed 26 Jun. 2017, the disclosure of which is incorporated herein by reference.

BACKGROUND INFORMATION

Avian eggs, particularly hen eggs, have been a food staple for centuries. Over time, different uses have manifested for egg whites and egg yolks.

Egg yolk involves supramolecular assemblies of lipids and proteins, due in large part to interactions between proteins and phospholipids.

Egg yolk includes two fractions: plasma (about two-thirds of the yolk) and granules (about one-third of the yolk). These fractions differ compositionally, with each possessing structures and functionalities that differ from those of the other. Plasma contains a large quantity of lipids structured as lipoproteins (low-density lipoproteins), whereas granules are mainly composed of proteins aggregated in micrometric assemblies.

In recent years, efforts at separating egg yolks into its constituent components have grown. These fractions have distinct physicochemical properties such as solubility (with the granules being poorly soluble in water, whereas the plasma has good solubility), ability to act as an emulsifier, and tendency to gel.

In addition to opening the possibility of individual components being used in the manufacture of non-food products, fractionation also opens the possibility of providing food products with reduced amounts of fat and cholesterol. Low cholesterol products can be made using the protein-rich, low-fat granule fraction as a substitute for egg yolk.

The plasma portion also contains valuable subcomponents such as, for example, immunoglobulin Y (IgY) and transfer factors. The presence of even a small amount of granules in the plasma portion greatly complicates the isolation of such valuable subcomponents.

Separating the granule and plasma portions of egg yolk typically involves at least one of a freezing step and addition of a carbohydrate such as an alginate.

That which remains desirable is an efficient, commercial scale process for fractionating egg yolk into its plasma- and granule-rich components which does not involve a time- and energy-intensive step, such as freezing, or the addition of a non-native nutritional additive such as a carbohydrate. Particularly desirable is such a process that can be operated in a semi-batch or even continuous manner.

SUMMARY

Hereinafter is described a method for fractionating liquid egg yolk into water soluble and precipitated lipophilic fractions. Without the need for a freezing step and/or addition of a carbohydrate such as an alginate, the egg yolk granules can be concentrated in the precipitated lipophilic fraction so that the water soluble fraction includes no more than 5% (w/w) of the granules.

To a composition that includes egg yolk and an excess of water is added a food grade acid, resulting in the pH of the composition being downwardly adjusted to 4≤pH≤6. The pH-adjusted composition is gravitationally separated into water soluble and precipitated lipophilic fractions. The method can be performed at non-elevated temperatures, i.e., at or below ambient temperature. The water soluble fraction of the fractionated egg yolk contains no more than 5%, and preferably less than 5%, of the granules from the egg yolk.

The composition includes at least as much water as egg yolk by volume and, in some embodiments, significantly more. Separational efficiency considerations argue for keeping this excess toward the lower end of the range.

The water component of the composition preferably has a low concentration of dissolved metal ions, preferably 100 ppm or below.

The fractionation process typically is performed at or below ambient temperatures yet, as mentioned above, freezing of the water-yolk composition is avoided.

Advantageously, the water soluble and precipitated lipophilic fractions are provided in a manner in which each is amenable to further processing by which the constituent components of each can be concentrated and/or isolated. By way of non-limiting example, this includes provision of a water soluble (low density) fraction which can be further processed so as to yield a relatively pure version of IgY.

Unless a portion of text specifically indicates otherwise, all percentages throughout this document are weight percentages, i.e., w/w.

The more detailed description that follows provides additional details which explain and exemplify the aforedescribed processes. The appended claims define the inventions in which exclusive rights are claimed, and they are not intended to be limited to particular embodiments shown and described, from which ordinarily skilled artisans can envision varia-tions and additional aspects.

DETAILED DESCRIPTION OF ILLUSTRATIVE EMBODIMENTS

None of the steps involved in the processes summarily described above need to be conducted at supra-ambient temperatures. The entireties of the processes are conducted such that the liquids involved do not encounter temperatures of 0° C. or less and no more than the temperature at which egg yolk proteins begin to coagulate, i.e., ~60° C. In most embodiments, each step of the method is conducted at a temperature of no more than ~50° C., no more than ~45° C., and even no more than ~40° C.; an exemplary maximum temperature is ~37° C. Generally, the processes are performed so that the liquids encounter no temperatures outside the range of 0° to 35° C., with preferred maximum temperatures being on the order of no more than 30° C., no more than 27.5° C., no more than 25° C., no more than 22.5° C., no more than 20° C., and even no more than 15° C. Food safety considerations typically argue for conducting the process at or near refrigerated temperatures, e.g., ~0.5° to 5° C.

The processes employ a composition that includes egg yolk and water.

Because the process is scalable, being limited only by the size of equipment available and structures in which to house or shelter such equipment, the amounts of each component are described herein in terms of relative volumes. Although any amount of composition can be employed in the process, operational efficiencies argue for usage of quantities measured on the scale of at least liters and preferably decaliters, hectoliters, or even megaliters.

The composition includes at least as much water (by volume) as egg yolk and often includes an excess of water. Generally, the volume ratio of water to egg yolk ranges from 1:1 to 10:1, with exemplary ratios including 10:9, 8:7, 5:4, 4:3, 3:2, 2:1, 5:2, 3:1, 8:3, 7:2, 4:1, 9:2, 5:1, 6:1 and 7:1. (Also contemplated are ranges defined by combinations of two of the foregoing ratios.) Operational efficiencies typically are achieved by keeping the excess of water as close as possible to the 2× lower limit.

The egg yolk employed in the composition can be liquid from a whole egg, preferably from hen eggs, or reconstituted. If the latter is employed directly, the amount of water employed in the composition must be upwardly adjusted by an appropriate amount to account for reconstitution. Alternatively, reconstitution can be done prior to introducing the egg yolk component into the composition, with such reconstitution being performed in the vessel employed for the mixing step (described below) or in a separate vessel from which the reconstituted egg yolk is pumped or otherwise transferred to the mixing vessel. In another embodiment, reconstitution can occur in a semi-batch or continuous manner by combining separate streams of appropriately metered amounts of dried egg yolk and water.

Although pasteurized egg yolk can be employed, the egg yolk preferably is not pasteurized, homogenized, or previously processed in a high shear mixture. Raw hen egg yolk is preferred.

Some sources of water might be sufficiently pure to permit usage of water from a nearby well or water treatment facility. Use of purified water (e.g., deionized or distilled) is preferred in those areas having water that contains significant amounts of alkali, alkali earth, or transition metal ions, however. The water component of the composition preferably has a metal ion concentration of no more than 250 ppm, preferably no more than 125 ppm, more preferably no more than 75 ppm, even more preferably no more than 50 ppm, and most preferably no more than 25 ppm.

Again, water can be added to the vessel employed for the mixing step (described below) in a batch, semi-batch or continuous manner, depending on the available equipment.

The composition typically is mixed or otherwise gently agitated so as to be macroscopically homogenous. Natural emulsifiers in egg yolk permit the hydrophobic subcomponents to mix well with the excess of water.

Unless the water source employed is unusually acidic, the egg yolk-water mixture generally will be only slightly acidic. Prior to the gravitational separation process described below, the pH of the composition is downwardly adjusted by addition of food grade acid. This can be done by addition of the acid to the agitated mixture, vice versa, or a combination, i.e., addition of the egg yolk-water mixture to a mixing vessel already containing some acid followed by sufficient additional acid to bring the adjusted mixture down to the targeted pH. In processes conducted in a semi-batch or continuous fashion, acid can be delivered in aliquots, discontinuous stream or continuous stream. Additionally, the acid can be added as a solid (typically in powder form) or diluted in water to provide an acid solution.

Potentially useful acids include strong acids, such as HCl and $H_2SO_4$, and weak acids including, but not limited to, phosphoric acid and any of a variety of carboxylic acids such as citric, malic, propanoic, sorbic and acetic acids.

Sufficient acid is added to provide a composition of from $4 \leq pH \leq 6$, preferably from $4.5 \leq pH \leq 5.8$, more preferably from $4.7 \leq pH \leq 5.7$, and even more preferably from $5.0 \leq pH \leq 5.6$. pH can be measured in a variety of ways including, for example, an appropriately calibrated pH sensor.

Operational efficiencies argue against significant mixing/agitation after the target pH is reached. Nevertheless, further mixing/agitation is not excluded from the process.

Upon the pH of the composition being downwardly adjusted, some or all of the composition (depending on the manner in which the process is conducted) is subjected to one or more gravitational separation techniques. Although the composition can be allowed to sit quiescently until fractionation occurs, operational considerations generally argue for employing mechanical means such as a clarifier, separator, decanter or centrifuge, with the latter being particularly preferred. In some embodiments, multiple centrifuging steps can be conducted in series. Depending on the gravitational force resulting from the mechanical devices employed, the amount of time involved in the separation step can range from a few seconds to several days, generally from 10 to 100,000 seconds, typically from 20 to 40,000 seconds, and most typically from 30 to 3000 seconds. In commercial scale applications, the gravitational separation step preferably takes no more than ~60 seconds.

Advantageously, the separation into water soluble and precipitated lipophilic fractions requires neither a freezing step nor addition of a carbohydrate such as an alginate. For an example of a process employing a freezing step, the interested reader is directed to P. Hodek et al., "Optimized Protocol of Chicken Antibody (IgY) Purification Providing Electrophoretically Homogeneous Preparation," *Intl. J. Electochem. Sci.*, vol. 8, pp. 113-24 (2013). For an example of a process employing addition of a carbohydrate, see S. Hwee Tan et al, "A novel, cost-effective and efficient chicken egg IgY purification procedure," *J. Immunolog. Methods*, vol. 380, pp. 73-76 (2012).

Regardless of the gravitational separation technique employed, the pH adjusted composition separates into water soluble and precipitated lipophilic fractions. The water soluble fraction is, in large part, lipoprotein-free (or at least substantially lipoprotein-free) plasma, while the precipitated lipophilic fraction includes the vast majority of the aforementioned granules. The separation is carried out such that no more than 5%, preferably no more than 4%, more preferably no more than 3%, even more preferably no more than 2%, and most preferably no more than ~1% of the granules apportion into the water soluble fraction, thereby resulting in the vast majority, even substantially all, of such granules locating in the lipophilic fraction.

Each of the two fractions contains components which are commercially valuable and, advantageously, are present in forms which facilitate further processing and separation.

The foregoing description has employed certain terms and phrases for the sake of brevity, clarity, and ease of understanding; no unnecessary limitations are to be implied therefrom because such terms are used for descriptive purposes and are intended to be broadly construed. The relevant portion(s) of any patent or publication specifically mentioned in the foregoing description is or are incorporated herein by reference.

The foregoing compositions and methods have been presented by way of example only. Certain features of the described compositions and methods may have been described in connection with only one or a few such compositions or methods, but they should be considered as being useful in other such compositions or methods unless their structure or use is incapable of adaptation for such additional use. Also contemplated are combinations of features described in isolation.

What is claimed is:

1. A method for fractionating liquid egg yolk into water soluble and precipitated lipophilic fractions, said method comprising:
   a) introducing to a composition that comprises liquid egg yolk and purified water, the volume of said water being from 1 to less than 5 times the volume of said liquid egg yolk, food grade acid so as to decrease the pH of said composition to a target pH of from 4 to 6, thereby providing a pH-adjusted composition, and
   b) without freezing or adding carbohydrate to said pH-adjusted composition, gravitationally separating said pH-adjusted composition into water soluble and precipitated lipophilic fractions, wherein less than 5% (w/w) of the granules from said liquid egg yolk are present in said water soluble fraction,
   each step of said method being conducted at a temperature of from 0° C. to 60° C.

2. The method of claim 1, wherein said liquid egg yolk comprises raw egg yolk or reconstituted egg yolk.

3. The method of claim 1, wherein said purified water has a metal ion concentration no greater than 50 ppm.

4. The method of claim 1, wherein said composition is agitated prior to and during introduction of said food grade acid.

5. The method of claim 1, wherein the target pH of said pH-adjusted composition is from 5.0 to 5.6.

6. The method of claim 1 wherein each step of said method is conducted at a temperature of from 0° C. to no more than 30° C.

7. The method of claim 1, wherein said gravitational separation involves centrifugation.

8. The method of claim 1, wherein the composition is not exposed to a temperature of less than 0° C. or greater than 60° C.

9. A method comprising:
   mixing a volume of water with a volume of liquid egg yolk to form a composition comprising liquid egg yolk and water, wherein the volume of water is from 1 to less than 5 times the volume of the liquid egg yolk;
   decreasing the pH of the composition by introducing an acid to the composition to form a pH-adjusted composition; and
   without adding carbohydrate to the pH-adjusted composition, gravitationally separating the pH-adjusted composition into a water soluble fraction and a precipitated lipophilic fraction,
   wherein less than 5% (w/w) of granules from the liquid egg yolk are present in the water soluble fraction.

10. The method of claim 9, wherein separating the pH-adjusted composition into the water soluble fraction and the precipitated lipophilic fraction does not involve a freezing step.

11. The method of claim 9, wherein the liquid egg yolk comprises raw egg yolk or reconstituted egg yolk.

12. The method of claim 9, wherein the composition is not exposed to a temperature of less than 0° C. or greater than 60° C.

13. The method of claim 1, wherein the volume of water is from 1 to 2 times the volume of the liquid egg yolk.

14. The method of claim 1, wherein the volume of water included in the composition is in excess of a volume of water equivalent to the volume of the liquid egg yolk, and wherein the excess volume of water is 2 times the volume of the liquid egg yolk.

15. The method of claim 1, wherein a ratio of the volume water to the volume of egg yolk comprises 3 parts water for every 1 part liquid egg yolk.

16. The method of claim 9, wherein the volume of water is from 1 to 2 times the volume of the liquid egg yolk.

17. The method of claim 9, wherein the volume of water included in the composition is in excess of a volume of water equivalent to the volume of the liquid egg yolk, and wherein the excess volume of water is 2 times the volume of the liquid egg yolk.

18. The method of claim 9, wherein a ratio of the volume water to the volume of egg yolk comprises 3 parts water for every 1 part liquid egg yolk.

19. The method of claim 9, wherein the target pH of the pH-adjusted composition is from 4 to 6.

* * * * *